(12) United States Patent
Williams

(10) Patent No.: US 11,866,074 B2
(45) Date of Patent: Jan. 9, 2024

(54) BELLY DUMP TRAILER WITH CONVEYORS FOR MOVING MATERIAL

(71) Applicant: Shiloh Williams, Upalco, UT (US)

(72) Inventor: Shiloh Williams, Upalco, UT (US)

( * ) Notice: Subject to any disclaimer, the term of this patent is extended or adjusted under 35 U.S.C. 154(b) by 331 days.

(21) Appl. No.: 17/234,569

(22) Filed: Apr. 19, 2021

(65) Prior Publication Data

US 2022/0332353 A1 Oct. 20, 2022

(51) Int. Cl.
*B61D 7/32* (2006.01)
*B61D 7/02* (2006.01)
*B61D 7/10* (2006.01)
B65G 67/24 (2006.01)

(52) U.S. Cl.
CPC .............. *B61D 7/32* (2013.01); *B61D 7/02* (2013.01); *B61D 7/10* (2013.01); *B65G 67/24* (2013.01)

(58) Field of Classification Search
CPC ... B61D 7/32; B61D 7/02; B61D 7/10; B61D 9/02; B65G 67/24
USPC ........................................................ 105/247
See application file for complete search history.

(56) References Cited

U.S. PATENT DOCUMENTS

| | | | | |
|---|---|---|---|---|
| 3,847,405 A * | 11/1974 | Pearce | ................... | B62D 21/14 280/80.1 |
| 3,921,839 A * | 11/1975 | Herpich | .................... | B65F 3/28 414/525.6 |
| 3,953,170 A * | 4/1976 | Webb | ..................... | B60P 1/006 100/295 |
| 4,044,899 A * | 8/1977 | Booher | ................... | B60P 1/006 414/517 |
| 4,096,956 A * | 6/1978 | Gaskin | ...................... | B65F 3/28 414/525.6 |
| 4,289,353 A * | 9/1981 | Merritt | ...................... | B60P 1/30 298/17.8 |
| 4,617,868 A * | 10/1986 | Wahlstrom | ............... | B61D 7/32 105/247 |
| 4,677,917 A * | 7/1987 | Dugge | ..................... | B61D 7/32 137/574 |
| 6,632,066 B1 * | 10/2003 | Kojima | ................... | B60P 1/006 414/521 |
| 9,643,526 B2 * | 5/2017 | Riggs | ...................... | B60P 1/006 |
| 10,118,528 B2 * | 11/2018 | Gordon | ................... | E01C 19/15 |
| 2005/0191158 A1 | 9/2005 | Byrne | | |
| 2009/0089354 A1 | 4/2009 | Kim | | |

(Continued)

FOREIGN PATENT DOCUMENTS

| | | | |
|---|---|---|---|
| DE | 2735180 A1 * | 2/1978 | |
| EP | 1992521 | 11/2008 | |
| FR | 2623152 A1 * | 5/1989 | |

*Primary Examiner* — Zachary L Kuhfuss
*Assistant Examiner* — James William Jones
(74) *Attorney, Agent, or Firm* — Kunzler Bean & Adamson

(57) ABSTRACT

Apparatuses, systems, and methods are disclosed for transporting and dumping material. A hopper for receiving materials may include a bottom surface with a front portion, a central portion, and a rear portion. The central portion may be lower than the front portion and the rear portion. A bottom gate may be disposed in the central portion for discharging the materials from the hopper. Conveyors may be provided for moving material from the front portion and the rear portion towards the bottom gate. The conveyors may include a front conveyor coupled to the front portion and a rear conveyor coupled to the rear portion.

20 Claims, 5 Drawing Sheets

(56) References Cited

U.S. PATENT DOCUMENTS

2015/0336496 A1* 11/2015 Smith ...................... B60P 1/56
  298/29
2015/0368052 A1   12/2015 Sheesley
2020/0385222 A1* 12/2020 Salciccia ............... B61D 15/00

* cited by examiner

BELLY DUMP TRAILER WITH CONVEYORS FOR MOVING MATERIAL

FIELD

This invention relates to belly dump trailers and more particularly relates to a belly dump trailer with conveyors for moving material.

BACKGROUND

Various types of dump trucks and dump trailers are used to transport various materials and deposit or dump the materials at a destination. Bottom dump or belly dump trailers discharge material from a gate at the bottom of a hopper, allowing the material to be deposited more precisely than from a standard dump truck or from an end dump or side dump trailer. Additionally, moving a belly dump trailer forward while discharging material allows the material to be deposited in an elongated row rather than in a pile, which may be advantageous for material that will be spread out more in one direction than in another direction. For example, a belly dump trailer may be used to deposit asphalt along a lane of a road. Sides or ends of belly dump trailers may be steeply sloped to facilitate flow of material out of the bottom gate.

SUMMARY

Apparatuses, systems, and methods are disclosed for transporting and dumping material. An apparatus, in one embodiment, includes a hopper for receiving materials. In a further embodiment, a bottom surface of the hopper includes a front portion, a central portion, and a rear portion, with the central portion lower than the front portion and the rear portion. In a further embodiment, a bottom gate is disposed in the central portion for discharging the materials from the hopper. In a further embodiment, an apparatus includes conveyors for moving material from the front portion and the rear portion towards the bottom gate. In a further embodiment, the conveyors include a front conveyor coupled to the front portion and a rear conveyor coupled to the rear portion.

A system, in one embodiment, includes a trailer. In a further embodiment, a hopper is mounted to the trailer for receiving materials. In a further embodiment, a bottom surface of the hopper includes a front portion, a central portion, and a rear portion, with the front portion and the rear portion higher than the central portion to accommodate wheels of the trailer and/or a tractor. In a further embodiment, a bottom gate is disposed in the central portion for discharging the materials from the hopper. In a further embodiment, a system includes conveyors for moving material from the front portion and the rear portion towards the bottom gate. In a further embodiment, the conveyors include a front conveyor coupled to the front portion and a rear conveyor coupled to the rear portion.

A method, in one embodiment, includes using a hopper to receive and transport materials to a location. In a further embodiment, a bottom surface of the hopper includes a front portion, a central portion, and a rear portion, with the central portion lower than the front portion and the rear portion. In a further embodiment, a method includes opening a bottom gate disposed in the central portion to discharge the materials from the hopper. In a further embodiment, a method includes actuating conveyors while the bottom gate is open, to move material from the front portion and the rear portion towards the bottom gate. In a further embodiment, the conveyors include a front conveyor coupled to the front portion and a rear conveyor coupled to the rear portion.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
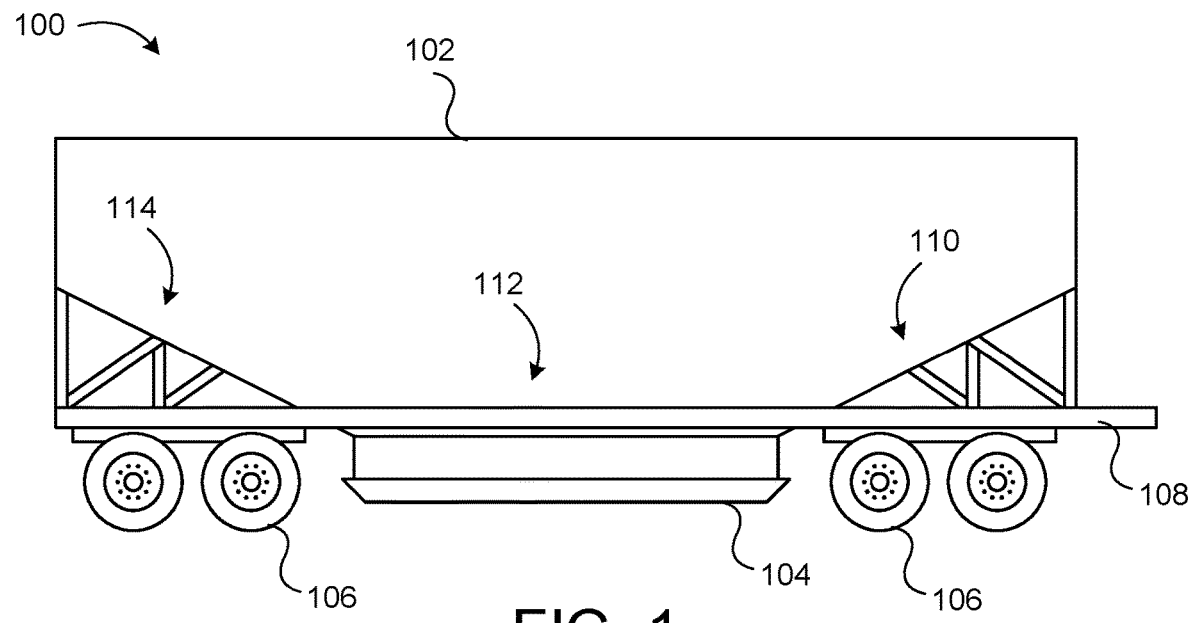
FIG. 1 is a side view illustrating one embodiment of a belly dump system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a side view illustrating one embodiment of a belly dump system 100. In the depicted embodiment, the belly dump system 100 includes a trailer 108 with front and rear wheels 106, a hopper 102, and a bottom gate 104, which are described below.

The trailer 108, in the depicted embodiment, is a vehicle that can be towed to move materials in the hopper 102. Various types and sizes of trailer 108 may be used in a belly dump system 100, depending on factors such as the desired capacity. For example, a larger trailer or a trailer with more axles may be used in a large-capacity belly dump system, and a smaller trailer or a trailer with fewer axles may be used in a small-capacity belly dump system. Additionally, although a trailer is depicted in FIG. 1, belly dump components such as a hopper 102 with a bottom gate 104 may be integral to a motor vehicle (e.g., a dump truck) rather than in a separate trailer 108.

The hopper 102, in the depicted embodiment, is a container for receiving materials to be transported and dumped by the belly dump system 100. In various embodiments, a belly dump hopper 102 may be loaded from the top and unloaded from the bottom, and thus may be open topped for loading. In some embodiments, a hopper 102 may include or be provided with a cover, to cover materials in the hopper 102 after loading. In some embodiments, however, a cover may be omitted. In various embodiments, a hopper 102 may be constructed of various materials such as steel or other metals, and may include sides made of sheet steel (or other substantially planar material) with bracing that may include steel beams, tubular steel, or the like. Various ways of making a hopper 102 for existing belly dump trailers may be used or modified to make a hopper 102 for the belly dump system 100.

Figure 8:
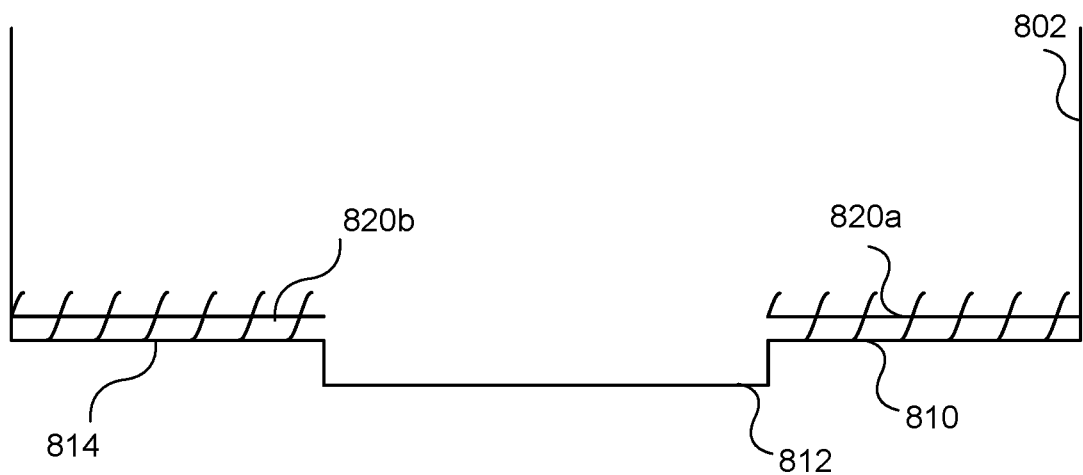
FIG. 8 is a side view illustrating components of a hopper and conveyors for a belly dump apparatus, in another embodiment.

In the depicted embodiment, the bottom surface of the hopper 102 includes a front portion 110, a central portion 112, and a rear portion 114. The bottom gate 104 is disposed in the central portion 112, which is lower than the front portion 110 and the rear portion 114. Having the front portion 110 and the rear portion 114 of the hopper bottom higher than the central portion 112 may accommodate the wheels 106 of the trailer 108 (or, in the case of a semitrailer, may accommodate tractor wheels at the front of the trailer 108, and trailer wheels at the back of the trailer 108). Additionally, having the central portion 112 lower than the front portion 110 and the rear portion 114 may allow the bottom gate 104 to be close to the ground to deposit materials more precisely than if the bottom gate 104 was higher up. In some embodiments, (e.g., as depicted in FIG. 8), the front and rear portions of the bottom of a hopper 102 may be flat, but raised above the central portion to accommodate wheels 106. In some embodiments, as in the depicted embodiment, the front portion 110 and rear portion 114 of the hopper bottom may slope downward toward the central portion 112, both to accommodate the wheels 106 and to facilitate flow of material out of the hopper via the bottom gate 104.

Directional terms such as "front," "rear," "top," and "bottom," "slope" "angle" and "horizontal" are used herein to describe the relative position and orientation of components to each other, with reference to a trailer 108 with the wheels on flat ground. Such terms are not used to imply absolute position or orientation. For example, a component may be described as "sloped" or "angled" at a particular angle from horizontal, referring to when the trailer itself is horizontal, and may still be described as being at that angle even if the trailer is parked on a slope that affects the absolute orientation of all the components of the trailer.

The bottom gate 104, in the depicted embodiment is disposed in the central portion 112 of the hopper bottom. Various types of bottom gate 104 already in use for belly dump trailers may also be used for a belly dump system 100. For example, a bottom gate 104 may be a "clam shell" gate with two sides that can be moved to open or close a central opening between the sides, and may be disposed with a longitudinal opening along the long axis of the trailer 108 for depositing material in narrow rows, or may be disposed with a transverse opening across the trailer 108 for disposing material more widely.

Some belly dump trailers may have steeply sloped front and rear surfaces to facilitate material flow out of the front and rear of the trailer and out the bottom gate. However, the size of the bottom gate itself may be limited by the distance between front and rear wheels. Thus, front and rear surfaces that extend in a steep slope up from the bottom gate may result in a hopper being much shorter than the trailer that carries it. The resulting small capacity of some belly dump trailers may affect costs of hauling materials by requiring more trips to be made than with a larger capacity trailer.

By contrast, various embodiments of a belly dump system 100 or a belly dump apparatus as disclosed herein may include conveyors for moving material from the front portion 110 and the rear portion 114 towards the bottom gate. Moving material from the front portion 110 and the rear portion 114 of the hopper 102 toward the bottom gate 104 by using conveyors, rather than by relying on a steep slope to facilitate flow, may allow hoppers 104 to be provided with front and rear portions 110, 114, that are more shallowly sloped than in gravity-fed belly dump trailers without conveyors, or that are even flat. Thus, the use of front and rear conveyors may increase capacity of belly dump trailers per trip, and reduce costs compared to belly dump trailers without conveyors. Various types of conveyors are described in further detail below with reference to FIGS. 3-10.

Figure 2:
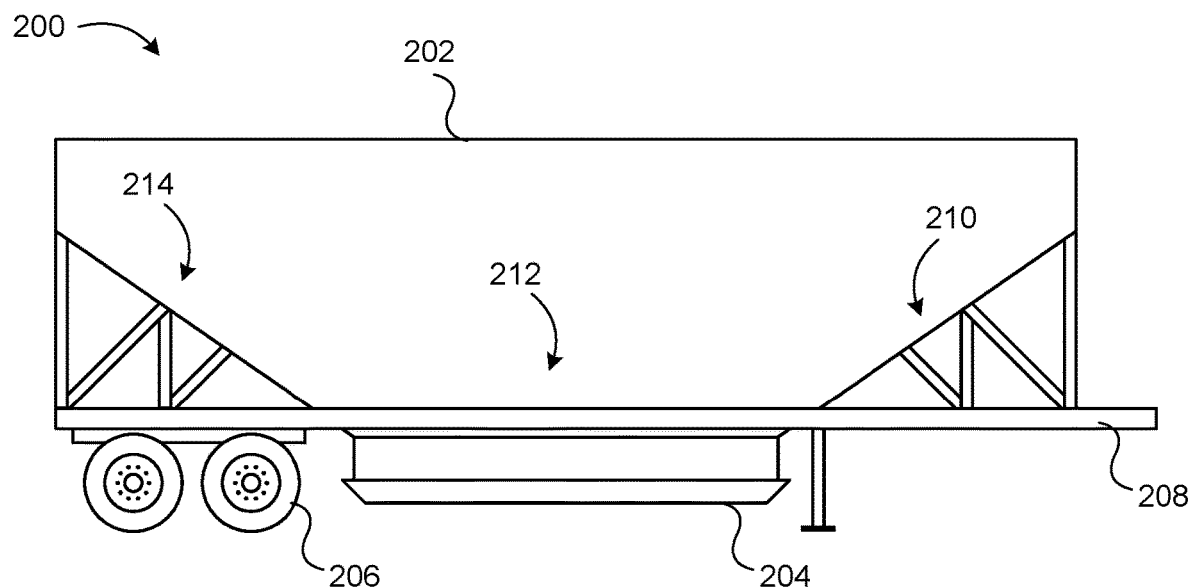
FIG. 2 is a side view illustrating another embodiment of a belly dump system.

FIG. 2 is a side view illustrating another embodiment of a belly dump system 200. In the depicted embodiment, the belly dump system 200 is substantially similar to the belly dump system 100 described above with reference to FIG. 1, including a trailer 208 with wheels 206, a bottom gate 204, and a hopper 202 with the bottom surface of the hopper 202 including a front portion 210, a central portion 212, and a rear portion 214, substantially as described above apart from differences that are described below.

As described above with reference to FIG. 1, the front portion 110 and rear portion 114 of the hopper bottom may be sloped at a shallower angle than in a gravity-fed belly dump trailer without conveyors. In the embodiment depicted in FIG. 1, the front portion 110 and the rear portion 114 are sloped toward the central portion 112 at an angle of less than 30 degrees from horizontal. In the belly dump system 200 depicted in FIG. 2, the front portion 210 and the rear portion 214 are more steeply sloped, but are still sloped toward the central portion 212 at an angle of less than 45 degrees from horizontal.

In various other embodiments, the front portion and the rear portion may be flat, or may be sloped at various angles, such as 20 degrees or less, 30 degrees or less, 40 degrees or less, 45 degrees or less, 50 degrees or less or the like. In some embodiments, the front portion may have the same slope as the rear portion, or may have a different slope than the rear portion. Shallower slopes may increase capacity of the hopper, but steeper slopes may facilitate flow allowing less powerful conveyors to be used. Thus, in some embodiments, slopes of front and rear portions may be selected by a manufacturer of a belly dump system to provide a balance between capacity and conveyor cost.

Additionally, in various embodiments, a trailer 108, 208 in a belly dump system 100, 200 may be a semitrailer or a full trailer. In FIG. 2, the trailer 208 is a semitrailer including rear wheels 206 below the rear portion 214, and a space below the front portion 210 for tractor wheels. By contrast, in FIG. 1, the trailer 108 for the belly dump system 100 is a full trailer with rear wheels 106 below the rear portion 114 and front wheels 106 below the front portion 110.

FIGS. 3-10 are side views illustrating components of a hopper and conveyors for a belly dump apparatus, in various embodiments. As in FIGS. 1 and 2, the hoppers are oriented with the front toward the right of the page and the rear to the left of the page. Side walls of the hoppers are not shown in FIGS. 3-10 so that components such as conveyors are visible inside the hoppers. Other components depicted in FIGS. 1 and 2, such as a bottom gate 104, 204, a trailer 108, 208 with wheels 106, 206, and the like, are not depicted for convenience in illustrating the hopper and conveyors. Nevertheless, a belly dump apparatus would include side walls for the hopper, a bottom gate, and the like.

Figure 3:
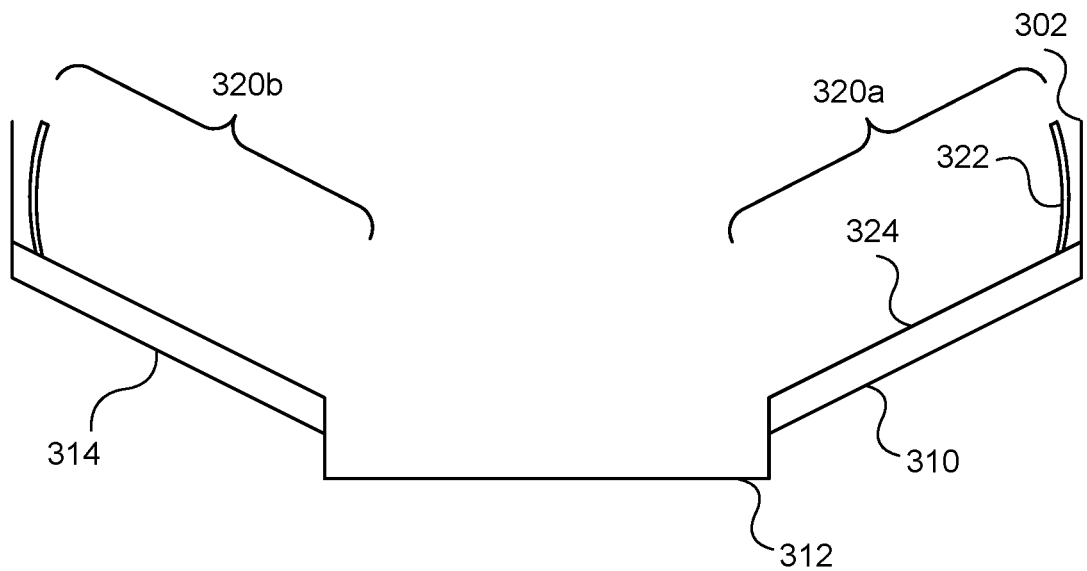
FIG. 3 is a side view illustrating components of a hopper and conveyors for a belly dump apparatus, in one embodiment.
Figure 4:
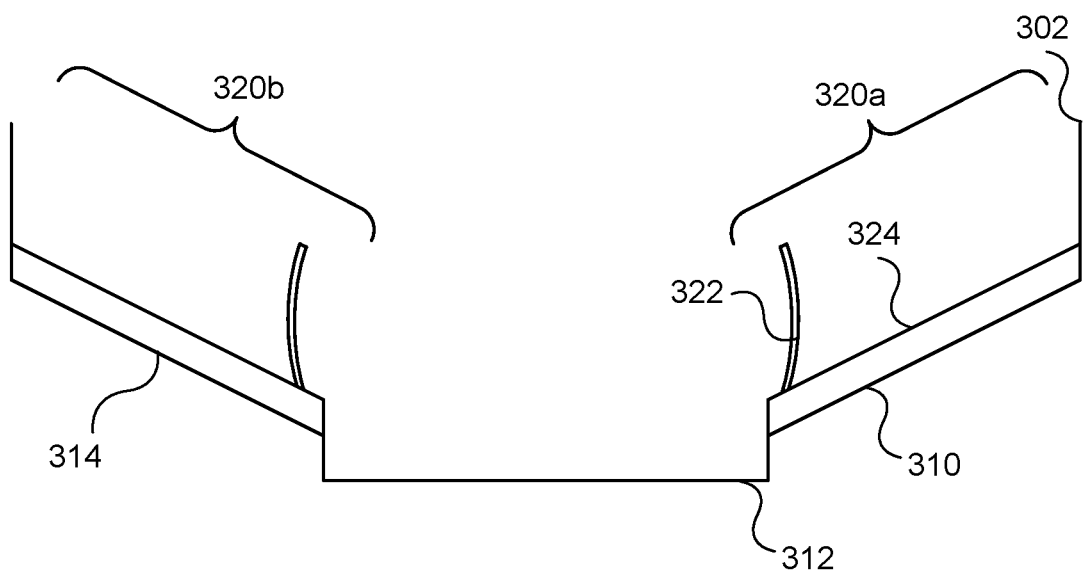
FIG. 4 is a side view further illustrating the hopper and conveyors depicted in FIG. 3.

FIGS. 3 and 4 depict one embodiment of a hopper 302 and conveyors 320 for a belly dump apparatus. The hopper 302 is substantially as described above with reference to previous figures, including a bottom surface with a front portion 310, central portion 312, and rear portion 314, substantially as described above. Conveyors 320*a*, 320*b* are provided for moving material from the front portion 310 and the rear portion 314 towards the bottom gate (not shown in FIG. 3 but disposed in the central portion 312).

In various embodiments, a conveyor 320 may be any device for conveying material from a front portion 310 or a rear portion 314 towards the bottom gate. Various types of conveyors 320 may include belt conveyors that move material on a belt, auger conveyors that move material by turning an auger, conveyors that drive a pusher blade to push material in a desired direction, conveyors that tilt a surface or a compartment to move material along the surface or the bottom of the compartment by gravity, or the like. Various other or further types of conveyors may similarly be used in a belly dump apparatus or system.

In various embodiments, conveyors 320 may include a front conveyor 320*a* coupled to the front portion 310, and a rear conveyor 320*b* coupled to the rear portion 314. The front conveyor 320*a* can be operated to move material from the front portion 310 toward the central portion 312 and the bottom gate. Similarly, the rear conveyor 320*b* can be operated to move material from the rear portion 314 toward the central portion 312 and the bottom gate. In various embodiments, front and rear conveyors 320*a*, 320*b* may be operated simultaneously, or may be operated independently.

In some embodiments, at least one of the conveyors 320 may include a pusher blade 322 for moving the material in the hopper 302, and a drive mechanism 324 for moving the pusher blade. In the depicted embodiment, both the front conveyor 320*a* and the rear conveyor 320*b* include a pusher blade 322 and a drive mechanism 324. A pusher blade 322 may be vertical, curved or the like, and may be made of steel or another material suitable for moving material in the hopper 302. A drive mechanism 324 may be any mechanism or actuator capable of moving the pusher blade 322 to push material. For example, a drive mechanism 324 may include a hydraulic cylinder, a pneumatic cylinder, a motor coupled to the pusher blade by a belt, a chain, or a leadscrew, or the like. Various other or further types of drive mechanism 324 may be suitable for moving a pusher blade 322.

Referring to FIG. 3, the pusher blades 322 are retracted towards the front and rear of the hopper 302, allowing the hopper 302 to be used to receive materials and transport the materials to a location (e.g., by towing a trailer 108 that includes or is coupled to the hopper 302). Upon arriving at the desired location, the bottom gate (not shown) is opened to discharge materials from the hopper 302. While the bottom gate is open, the conveyors 320 may be actuated to move material from the front portion 310 and the rear portion 314 towards the bottom gate, to be discharged from the hopper 302. FIG. 4 depicts the pusher blades 322 having been moved toward the central portion 312 to discharge material out the bottom gate. When the material has been discharged, the conveyors 320 may be reversed to bring the pusher blades 322 back to the position shown in FIG. 3, to receive and transport another load of material (e.g., the same type of material, or another type of material).

Figure 5:
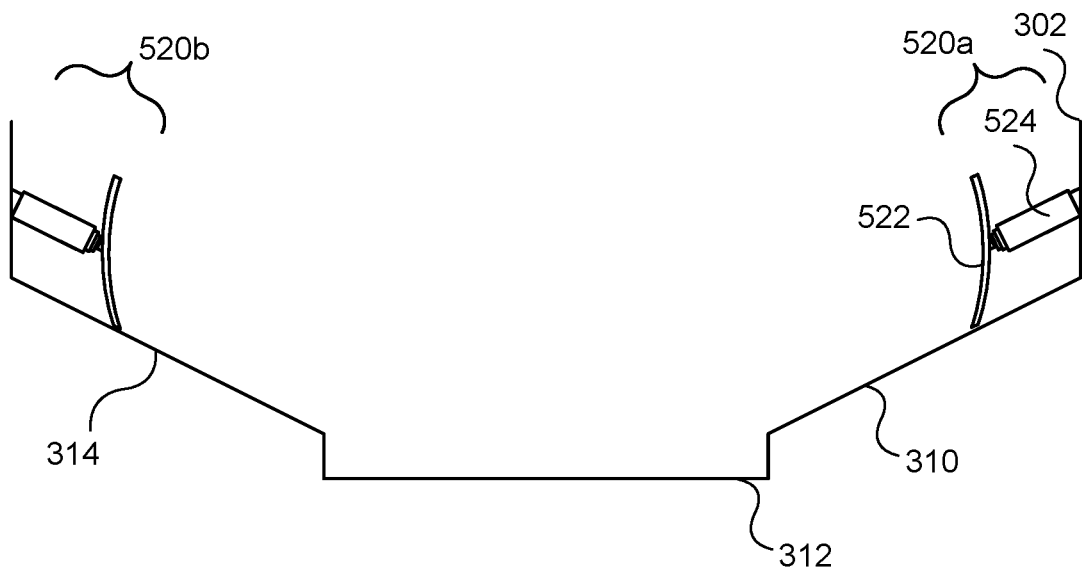
FIG. 5 is a side view illustrating components of a hopper and conveyors for a belly dump apparatus, in another embodiment.
Figure 6:
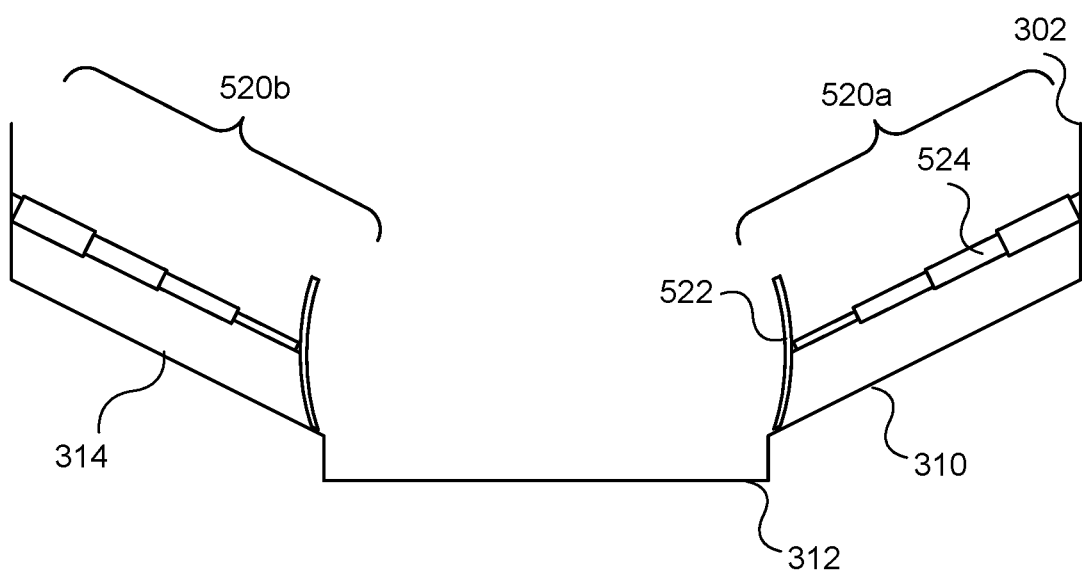
FIG. 6 is a side view further illustrating the hopper and conveyors depicted in FIG. 5.

FIGS. 5 and 6 depict another embodiment of a hopper 302 and conveyors 520 for a belly dump apparatus. The hopper 302 is substantially as described above with reference to FIGS. 3 and 4. In the depicted embodiment, conveyors 520*a*, 520*b* include a pusher blade 522 and a drive mechanism 524 which may be substantially as described above, apart from differences which are described below.

The drive mechanism 524, in the depicted embodiment, is a hydraulic cylinder. In another embodiment, a drive mechanism 524 may be a pneumatic cylinder. In some embodiments, telescopic hydraulic or pneumatic cylinders may be used in a drive mechanism 524 to reduce the retracted length compared to single-stage cylinders.

The hopper 302 may be loaded and transported with the pusher blades 522 retracted towards the front and back of the hopper. When the bottom gate is opened to discharge materials at the desired location, the drive mechanisms 524 may be operated to move the pusher blades, pushing the materials toward the central portion 312 to exit the bottom gate.

Figure 7:
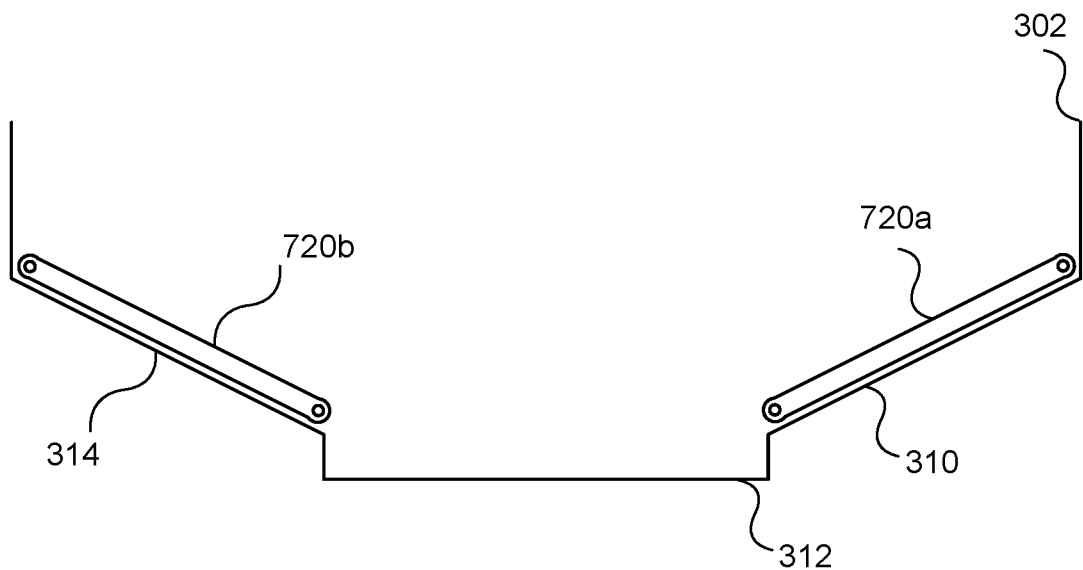
FIG. 7 is a side view illustrating components of a hopper and conveyors for a belly dump apparatus, in another embodiment.

FIG. 7 depicts another embodiment of a hopper 302 and conveyors 720 for a belly dump apparatus. The hopper 302 is substantially as described above with reference to FIGS. 3-6. In the depicted embodiment, conveyors 720a, 720b are belt conveyors, with belts that are driven to move material toward the central portion 312.

FIG. 8 depicts another embodiment of a hopper 802 and conveyors 820 for a belly dump apparatus. The hopper 802 is substantially as described above with reference to previous Figures, with a bottom surface that includes a front portion 810, a central portion 812, and a rear portion 814. However, in the depicted embodiment, unlike in previous Figures, the front portion 810 and the rear portion 814 are flat, thus providing a higher capacity for the hopper 802.

The conveyors 820, in the depicted embodiment, are auger conveyors that move material in the hopper by driving a helical screw. In some embodiments, multiple auger conveyors 820 may be provided to move material along a flat surface wider than the augers, or side walls of the hopper 802 may be sloped to move material toward the augers. Various other or further ways of configuring a hopper 802 for use with auger conveyors 820 will be clear to a skilled person.

Although FIGS. 3-7 depict a hopper 302 with sloped front and rear portions, while FIG. 8 depicts a hopper 802 with flat front and rear portions, various types of conveyor may be used with various shapes of hopper. For example, pusher blades 322 or belt conveyors 720 may be used with a hopper 802 with flat front and rear portions, or auger conveyors 820 may be used with a hopper 302 with sloped front and rear portions.

Figure 9:
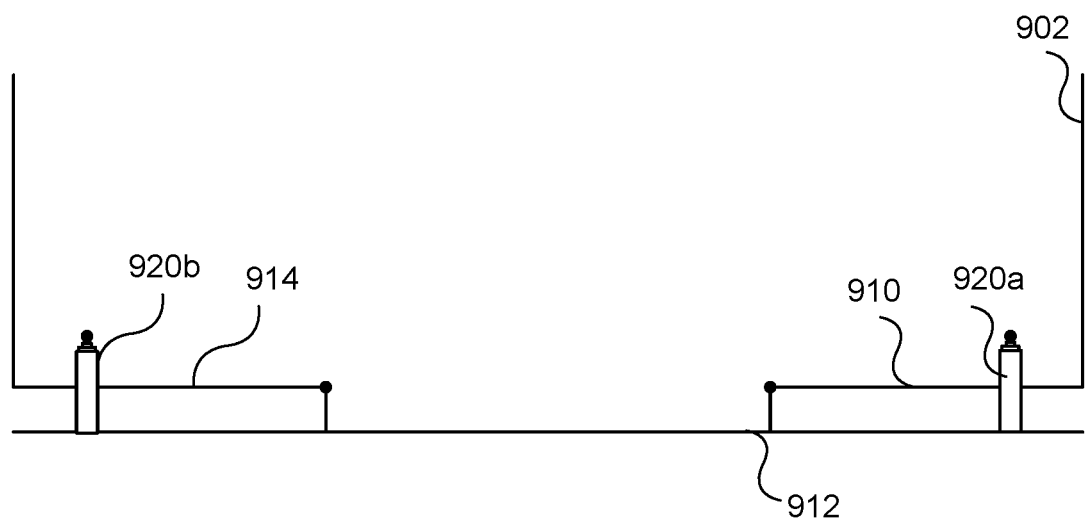
FIG. 9 is a side view illustrating components of a hopper and conveyors for a belly dump apparatus, in another embodiment.
Figure 10:
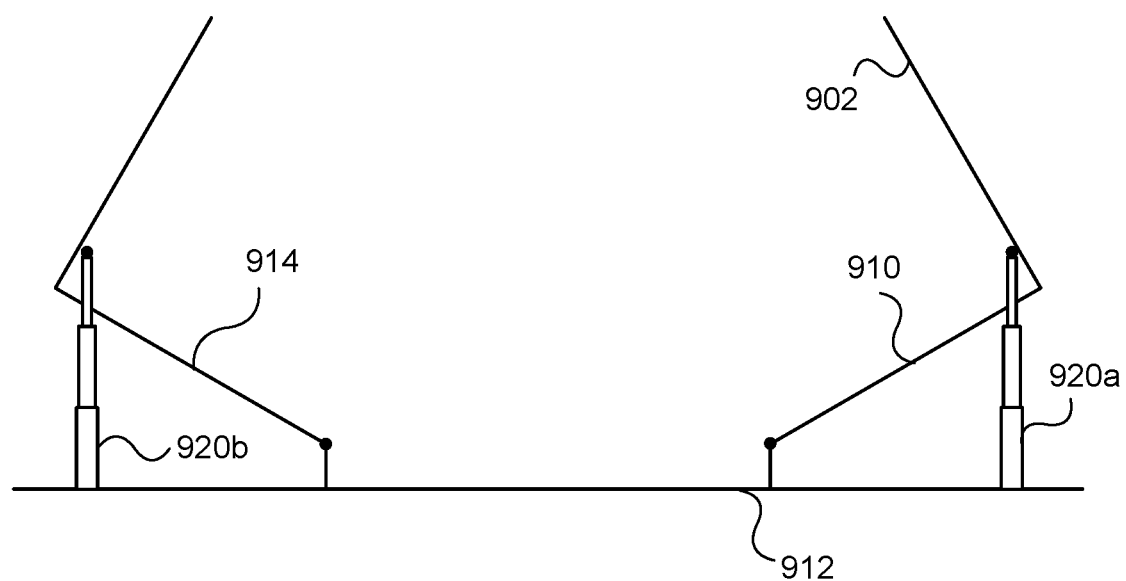
FIG. 10 is a side view further illustrating the hopper and conveyors depicted in FIG. 5.

FIGS. 9 and 10 depict another embodiment of another embodiment of a hopper 902 and conveyors 920 for a belly dump apparatus. As described above with reference to previous figures, the hopper 902 has a bottom surface with the front portion 910, a central portion 912 where the bottom gate (not shown) is disposed, and a rear portion 914, and the conveyors 920 include a front conveyor 920a and a rear conveyor 920b.

In the depicted embodiment, the front portion 910 and the rear portion 914 are pivotably coupled to the central portion 912. This pivotable coupling allows the front portion 910 and the rear portion 914 to be tilted up to discharge material from the hopper through the bottom gate. The front conveyor 920a and the rear conveyor 920b both include hydraulic rams for tilting the front and rear portions, respectively. In various embodiments, hydraulic rams for tilting front and rear portions may be coupled to the bottom of the hopper 902, to sidewalls of the hopper 902, or the like. In the depicted embodiment, the hydraulic rams are coupled to the sidewalls (not shown) of the hopper 902.

FIG. 9 shows the front and rear portions untilted, with the hydraulic rams retracted. In this position, the hopper 902 may be loaded and transported. Upon reaching a desired location, the bottom gate may be opened to discharge material, and the hydraulic rams may be extended to tilt the front and rear portions, as shown in FIG. 10.

FIGS. 3-10 depict various types of conveyors, with the same type of conveyor used as both the front conveyor and the rear conveyor. However, in some embodiments, the front conveyor and the rear conveyor may be different types of conveyors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a hopper for receiving materials, a bottom surface of the hopper comprising a front portion, a central portion, and a rear portion, with the central portion lower than the front portion and the rear portion;
   a bottom gate disposed in the central portion for discharging the materials from the hopper;
   pusher blades for moving material from the front portion and the rear portion towards the bottom gate, the pusher blades comprising a front pusher blade coupled to the front portion and a rear pusher blade coupled to the rear portion, wherein a drive mechanism is actuated for moving the front pusher blade and the rear pusher blade simultaneously towards one another to move material in the hopper towards the bottom gate.

2. The apparatus of claim 1, wherein the front portion and the rear portion are sloped toward the central portion at an angle of less than 45 degrees from horizontal.

3. The apparatus of claim 1, wherein the front portion and the rear portion are sloped toward the central portion at an angle of less than 30 degrees from horizontal.

4. The apparatus of claim 1, wherein the front portion and the rear portion are flat.

5. The apparatus of claim 1, wherein the drive mechanism comprises one of: a hydraulic cylinder and a pneumatic cylinder.

6. The apparatus of claim 1, wherein the drive mechanism comprises a motor coupled to the pusher blade by at least one of: a belt, a chain, and a leadscrew.

7. The apparatus of claim 1, wherein the front portion and the rear portion are pivotably coupled to the central portion, the front pusher blade comprises a front hydraulic ram for tilting the front portion, and the rear pusher blade comprises a rear hydraulic ram for tilting the rear portion.

8. A system comprising:
   a trailer;
   a hopper mounted to the trailer for receiving materials, a bottom surface of the hopper comprising a front portion, a central portion, and a rear portion, with the front portion and the rear portion higher than the central portion to accommodate wheels of one or more of the trailer and a tractor;
   a bottom gate disposed in the central portion for discharging the materials from the hopper; and
   pusher blades for moving material from the front portion and the rear portion towards the bottom gate, the pusher blades comprising a front pusher blade coupled to the front portion and a rear pusher blade coupled to the rear portion, wherein a drive mechanism is actuated for moving the front pusher blade and the rear pusher blade simultaneously towards one another to move material in the hopper towards the bottom gate.

9. The system of claim 8, wherein the trailer is a semi-trailer comprising rear wheels below the rear portion and a space below the front portion for tractor wheels.

10. The system of claim 8, wherein the trailer comprises rear wheels below the rear portion and front wheels below the front portion.

11. The system of claim 8, wherein the drive mechanism comprises a hydraulic cylinder.

12. The system of claim 8, wherein the drive mechanism comprises a pneumatic cylinder.

13. The system of claim 8, wherein the drive mechanism comprises a motor coupled to the pusher blade by at least one of: a belt, a chain, and a leadscrew.

14. A method comprising:
  using a hopper to receive and transport materials to a location, a bottom surface of the hopper comprising a front portion, a central portion, and a rear portion, with the central portion lower than the front portion and the rear portion;
  opening a bottom gate disposed in the central portion to discharge the materials from the hopper; and
  while the bottom gate is open, actuating pusher blades to move material from the front portion and the rear portion towards the bottom gate, the pusher blades comprising a front pusher blade coupled to the front portion and a rear pusher blade coupled to the rear portion, wherein a drive mechanism is actuated for moving the front pusher blade and the rear pusher blade simultaneously towards one another to move material in the hopper towards the bottom gate.

15. The method of claim 14, wherein the front portion and the rear portion are sloped toward the central portion at an angle of less than 45 degrees from horizontal.

16. The method of claim 15, wherein the front portion and the rear portion are pivotably coupled to the central portion, the front pusher blade comprises a front hydraulic ram for tilting the front portion, and the rear pusher blade comprises a rear hydraulic ram for tilting the rear portion.

17. The method of claim 14, wherein the front portion and the rear portion are sloped toward the central portion at an angle of less than 30 degrees from horizontal.

18. The method of claim 14, wherein the front portion and the rear portion are flat.

19. The method of claim 14, wherein the drive mechanism comprises one of: a hydraulic cylinder and a pneumatic cylinder.

20. The method of claim 14, wherein the drive mechanism comprises a motor coupled to the pusher blade by at least one of: a belt, a chain, and a leadscrew.

* * * * *